United States Patent [19]

Lovell et al.

[11] Patent Number: 5,593,166
[45] Date of Patent: Jan. 14, 1997

[54] LOW FRICTION PACKING

[75] Inventors: Michel K. Lovell; Randall S. Jackson; Ronald R. Brestel, all of Marshalltown, Iowa

[73] Assignee: Fisher Controls International, Inc., Clayton, Mo.

[21] Appl. No.: 204,637

[22] Filed: Mar. 2, 1994

[51] Int. Cl.$^6$ .................................................... F16J 15/20
[52] U.S. Cl. ........................... 277/59; 277/106; 277/124; 277/125; 277/205
[58] Field of Search ........................... 277/59, 64, 106, 277/123, 124, 125, 205

[56] References Cited

U.S. PATENT DOCUMENTS

| | | | |
|---|---|---|---|
| 3,404,061 | 10/1968 | Shane et al. | 161/125 |
| 3,588,125 | 6/1971 | Mastromatteo | 277/59 X |
| 4,270,762 | 6/1981 | Johnston | 277/59 |
| 4,305,567 | 12/1981 | Lunt | 251/214 |
| 4,352,499 | 10/1982 | Foster | 277/59 |
| 4,407,988 | 10/1983 | Abrahams et al. | 523/334 |
| 4,558,874 | 12/1985 | Williams et al. | 277/112 |
| 4,570,942 | 2/1986 | Diehl et al. | 277/125 X |
| 4,576,385 | 3/1986 | Ungchusri et al. | 277/125 X |
| 4,826,181 | 5/1989 | Howard | 277/112 |
| 4,961,991 | 10/1990 | Howard | 428/246 |
| 5,039,112 | 8/1991 | Ulrich et al. | 277/35 |
| 5,040,368 | 8/1991 | Baker | 277/59 X |
| 5,056,757 | 10/1991 | Wood | 251/214 |
| 5,056,758 | 10/1991 | Bramblet | 277/59 X |
| 5,129,624 | 7/1992 | Icenhower et al. | 251/214 |
| 5,129,625 | 7/1992 | Wood et al. | 251/214 |
| 5,131,666 | 7/1992 | Hutchens | 277/124 |
| 5,134,030 | 7/1992 | Ueda et al. | 428/365 |
| 5,153,253 | 10/1992 | Moisey et al. | 524/439 |
| 5,162,157 | 11/1992 | Tanaka et al. | 428/549 |
| 5,178,363 | 1/1993 | Icenhower et al. | 251/214 |
| 5,190,264 | 3/1993 | Boger | 277/64 X |
| 5,230,498 | 7/1993 | Wood et al. | 251/214 |
| 5,299,812 | 4/1994 | Brestel et al. | 277/125 |

FOREIGN PATENT DOCUMENTS

| | | |
|---|---|---|
| 0010776A1 | 5/1980 | European Pat. Off. . |
| 0422342A1 | 4/1991 | European Pat. Off. . |
| 0483096A1 | 4/1992 | European Pat. Off. . |
| 0494064 | 7/1992 | European Pat. Off. ................ 277/106 |
| 2441602A1 | 1/1976 | Germany . |
| 145871 | 1/1981 | Germany . |
| 2-17270A | 1/1990 | Japan . |
| 2-93171A | 4/1990 | Japan . |

OTHER PUBLICATIONS

Valtek, *Fugitive Emissions Control*, SafeGuard Live–loaded Packing, Jul. 1991.
Valtek, *Fugitive Emissions Control*, SureGuard Packing, Jul. 1991.

*Primary Examiner*—William A. Cuchlinski, Jr.
*Assistant Examiner*—John L. Beres
*Attorney, Agent, or Firm*—Marshall, O'Toole, Gerstein, Murray & Borun

[57] ABSTRACT

A two-part, low friction, live loaded packing system for fire safety and low fugitive emission sealing (less than 500 ppm) of a valve stem at operating temperatures up to 450° F. (232° C.). One lower packing ring set around the valve stem has PTFE washers sandwiched between flexible graphite rings to provide fire safety and low friction. An upper packing ring set around the valve stem is closer to the loading source and has V-type PTFE rings to provide reliable low fugitive emission sealing and low friction. The live loading is optimized to maintain a seal at the upper packing set to less than 500 ppm leakage, minimize packing friction from both the upper and lower packing sets, and seal the lower packing set during fire safety tests.

14 Claims, 2 Drawing Sheets

LOW FRICTION PACKING

This invention relates to packing containments for sealing operating members in a housing with fluids, and in particular to a packing containment assembly useful in meeting very stringent fluid leakage restrictions and fire safety conditions and in environments where the prevention of catastrophic leakage of for instance valve structures is desired.

BACKGROUND OF THE INVENTION

Packing materials are widely used to prevent fluid leakage around an operating member in a housing with fluid, such as a rotary shaft or a sliding stem in fluid control valves or in a reciprocating pump shaft. Normally such packing is formed of a resilient member and is placed under a static load by being bolted into position within a packing box around the operating member. In other instances the packing is subjected to spring loading in what is known as a live loaded packing configuration. Live loaded packing is particularly useful in attempting to prevent undesired leakage of fluids into the environment. Also, at operating temperature conditions above approximately 450° F. (232° C.) (i.e., operating temperature in the packing area) it is desired to use commonly available graphite packing rather than packing material formed of polytetrafluoroethylene (PTFE) because PTFE packing tends to extrude at such elevated temperatures which could lead to packing failure and fluid leakage. At temperatures below 450° F. (232° C.) PTFE packing is desired because it has substantially lower friction than graphite packing. Excessive friction contributes to poor control of fluid processes.

As an example, certain applications of a fluid control valve require not only that the valve meet stringent leakage requirements and have low friction, but that it also meet a stringent packing-performance fire test to prevent catastrophic packing failure. Packing for fluid-control valves used in petroleum refineries, and in other chemical processing applications, is desired to have low friction and nearly zero leakage (i.e., less than 500 ppm as per EPA Method 21) of fluid around the top of the valve under normal operating conditions. In addition, it is desired that the packing not fail when exposed to high temperature thereby permitting excessive leakage of flammable fluids during a fire.

In such applications, graphite packing is well suited for preventing excessive leakage during a fire, however, the high packing stress required to provide nearly zero leakage during normal operating conditions results in high friction from the graphite packing, leading to less precise process control when compared to PTFE packing. Attempts to decrease the loading on the graphite packing provides a significant reduction in friction but leads to excessive leakage (greater than 500 ppm). To reduce the leakage and friction, it is desired to use PTFE packing material which can provide a tighter, longer lasting seal than graphite material. However, the use of PTFE packing at elevated packing temperatures is normally not recommended, and particularly where the valve must meet packing-performance fire tests, as in refinery applications. The potential extrusion, decomposition, and vaporization of PTFE packing under high temperature fire conditions would lead to catastrophic packing failure and undesired hazardous fluid leakage.

Thus, it is desired to provide packing for control valves which exhibit low friction, fire safety, nearly zero leakage, long service life, and reasonable cost concurrently.

SUMMARY OF THE INVENTION

In accordance with the principles of the present invention, there is provided a packing containment system having low friction characteristics and useful for fire safety and low fugitive emission sealing of an operating member in a housing with fluid, such as in a sliding stem valve, rotary shaft valve, or reciprocating pump shaft. A two-part packing assembly is provided mounted on the operating member, and includes a respective plurality of first and second packing ring sets providing a fluid seal surrounding the operating member for preventing fluid from leaking from the housing around the operating member. The first packing ring set is mounted on the operating member end closest to the fluid, which in a valve would be closest to the valve plug end. The first packing ring set includes at least one flexible graphite ring, at least two anti-extrusion bushing rings, and a washer formed of polymeric material with low friction characteristics, such as PTFE, mounted between each of the aforementioned rings. The first packing ring set includes a substantial amount of graphite material to provide fire safety and wiping action, and includes a sufficient amount of low friction material, such as PTFE, to prevent graphite adhesion to the operating member and add lubrication.

A second packing ring set is mounted on the operating member at the operating member end away from the fluid, closer to the exterior of the housing, such as the valve exterior. The second packing ring set includes V-type PTFE packing rings and an anti-extrusion ring at each end. The second packing ring set provides low fugitive emission sealing of the fluid around the operating member in the housing and low friction operation of the operating member.

The two-part packing assembly is live loaded with spring loading means, such as disk springs, to maintain the packing assembly at a stress level to provide a low friction, low emission seal for both fire safety and fugitive emission service capable of meeting for instance the fire test requirements on the packing system under specification API-589 and the specifications for API-607.

In particular, in accordance with the principles of the present invention, the second packing set closest to the load source developed by the disk springs, is subjected to a specific maintained load, resulting in the optimal packing stress for low leakage during normal operating conditions taking into consideration the stem or shaft diameter, the packing cross section, and the packing material. The load is sufficient to cause the PTFE material to deform and fill voids in the operating member and in the packing bore thereby providing low friction and low emission characteristics. Due to the low friction of the second packing ring set with respect to the housing and the operating member, the load is effectively transferred through the second packing ring set to the first packing ring set which is further from the loading source. During the initial installation and adjustment process, a load in excess of the normal operating load is imposed temporarily on the second packing ring set. This load is effectively transferred to the first packing ring set and is sufficient to cause permanent deformation and thereby effect a lasting seal capable of providing fire safety as well as provide wiping action. The wiping action prevents damaging contaminants from getting to the second packing ring set during normal operation, even though the spring load has been reduced to the optimal load for sealing at the second packing ring set.

Accordingly, flexible graphite packing materials are used in the present invention in conjunction with PTFE packing materials to provide a low friction, low fugitive emission, fire safe packing system. The graphite materials are located closest to the process fluid to insulate the PTFE material from the process fluid and provide a fire-safe seal. The PTFE materials provide a seal on the operating member to limit fugitive emissions below 500 ppm. Low friction, as compared to traditional graphite packing systems used for fugitive emission service, is obtained by loading the graphite packing to lower stress levels. The friction of the combined PTFE/graphite system is significantly less than the friction of a sole graphite packing system with similar leakage characteristics.

In a constructed embodiment of the invention for leakage test purposes, a half-inch sliding stem valve incorporated live loading in the form of disk springs mounted around the stem adjusted to an initial applied packing stress of 1783 psi (12.3 MPa). The first or bottom most packing ring set closest to the fluid included two flexible graphite rings, three PTFE washers, and two carbon bushings with the bushings on the end and a PTFE washer between each of the adjacent graphite rings and carbon bushings. The second or upper packing ring set included a virgin or unfilled PTFE V-ring sandwiched between a carbon filled female PTFE V-ring and a carbon filled male PTFE V-ring and with a respective carbon bushing on each end.

The packing assembly was subjected to an EPA Method 21 leakage test with over 100,000 mechanical cycles of operation, and a packing leakage of less than 500 ppm was obtained using methane as the test fluid. During the mechanical cycles, the packing temperature was subjected to varying thermal cycles repetitively between the ambient temperature and 450° F. (232° C.). The process pressure was also varied between a pressure of 750 psi (5.17 MPa) at the lower packing temperature to a pressure of 450 psi (3.1 MPa) at the upper packing temperature of 450° F. (232° C.). It was found that during the mechanical cycles, packing friction was very low so that the friction of the combined two-part packing assembly with PTFE and graphite material is significantly less than the friction of a sole graphite packing system with similar leakage characteristics.

Rather than the flexible graphite rings in the first packing ring set, composite graphite rings could be substituted. Such graphite composite packing rings are slightly harder than the flexible graphite ring material and are disclosed for instance in U.S. Pat. No. 4,826,181. Similarly, braided graphite rings could be used to give different levels of friction and sealing capability in the packing system. Also, other non-graphite materials, such as fluoroelastomers or perfluoroelastomers, may be used to provide a low friction, low fugitive emission seal.

BRIEF DESCRIPTION OF DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
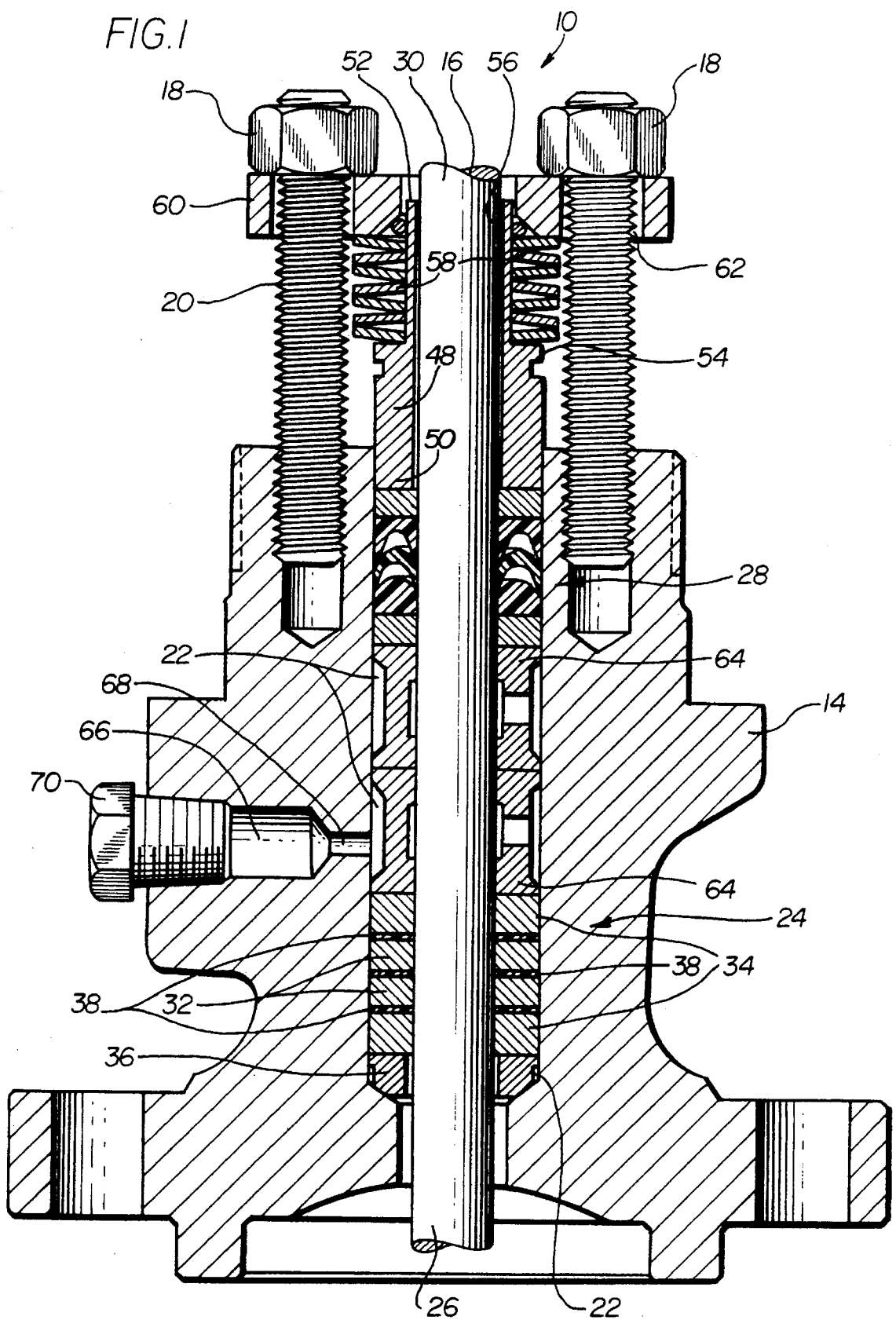
FIG. 1 is a cross-sectional view illustrating a preferred embodiment of the two-part packing assembly of the present invention in a sliding stem valve.

As indicated previously, the principles of this invention are applicable to sliding stem or rotating shaft valves, as well as reciprocating pump shaft units. FIG. 1 illustrates for instance a sliding stem valve incorporating a two-part packing assembly in accordance with the principles of this invention.

The illustrated portion of a fluid valve 10 of the sliding stem valve type includes a valve body with a valve bonnet 14 through which extends an operating member such as a sliding stem 16. A series of packing nuts 18 are threadably mounted on respective packing studs 20 so as to adjust the loading on the packing within the bonnet and around the valve stem.

Within a packing box formed of a packing bore 22 in valve bonnet 14, there is provided a first packing ring set 24 mounted around the valve stem 16 at stem end 26 closest to the process fluid. A second packing ring set 28 in the two-part packing assembly is mounted within the packing bore 22 around the valve stem 16 at the valve stem end 30 further away from the process fluid than the valve stem end 26.

Figure 2:
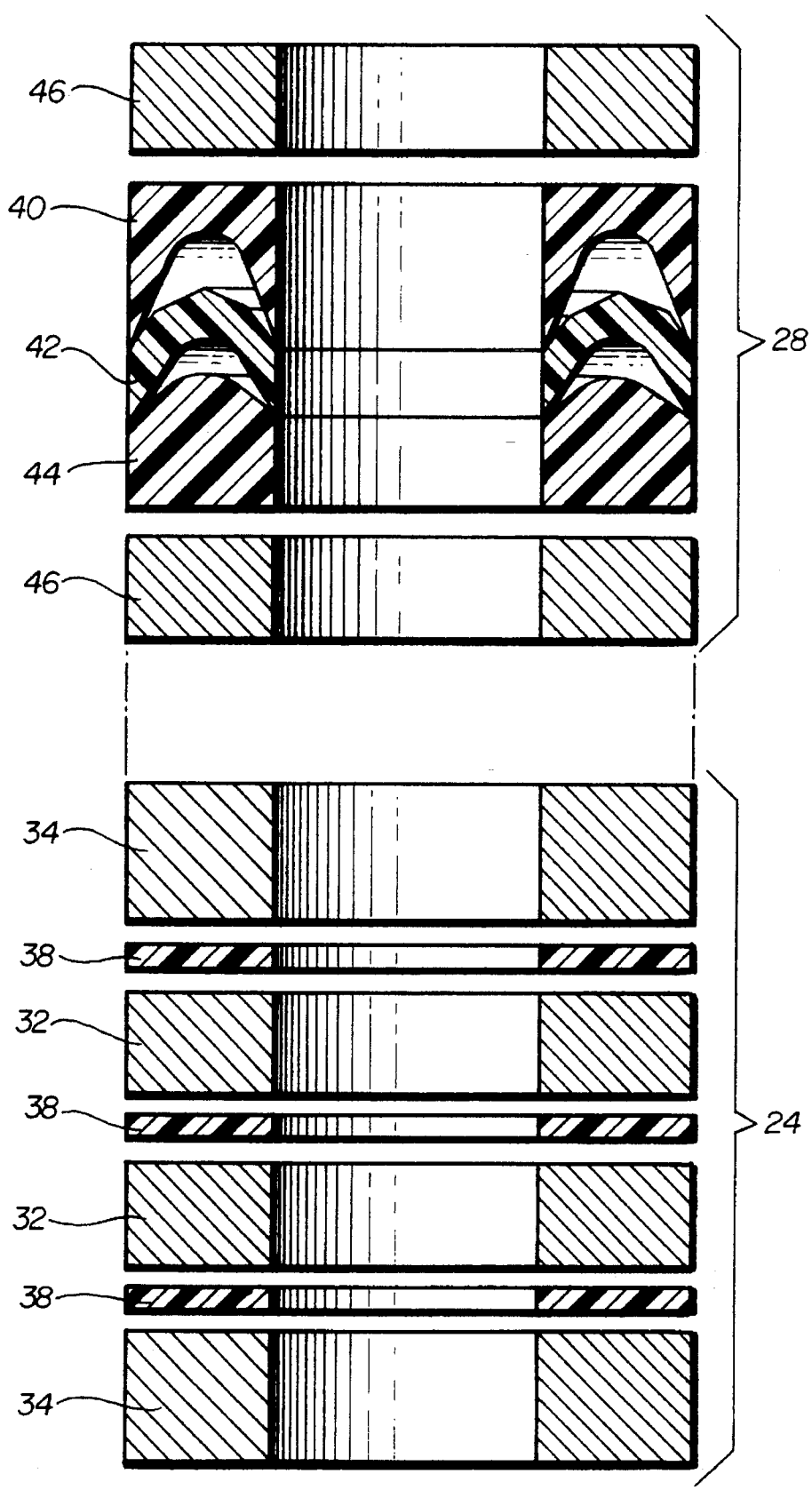
FIG. 2 is an exploded view illustrating the two-part packing assembly details.

As can be seen in more detail with respect to FIG. 2, the first packing ring set 24 includes a pair of flexible graphite rings 32 which are conventional packing rings of die formed ribbon flexible graphite. The flexible graphite rings 32 are relatively soft material each of which readily acts to seal the valve stem. At each opposite end of the first packing ring set 24 there is provided a conventional carbon bushing ring 34 which act as anti-extrusion members to help prevent transfer of the softer flexible graphite material on the valve stem 16. Since the carbon bushings 34 are harder than the flexible graphite rings 32, bushings 34 tend to wipe the sliding stem valve 16 during operation thereof so as to aid in the prevention of transfer of flexible graphite material to the stem. The bushings 34 also aid in maintaining the valve stem 16 centered in the packing box to prevent deformation and destruction of the softer packing material in packing ring set 24. A packing box end ring 36 takes up the rest of the space within the packing box.

Three polymeric rings having low friction characteristics, in the form of thin PTFE disks or washers 38, each about 0.015 inch (0.381 mm) are provided so that a respective PTFE disk 38 is inserted between each of the flexible graphite rings 32 and between the flexible graphite ring 32 and the carbon bushings 34. The PTFE disk material is intended to deform and partially extrude inward against the valve stem 16 so that the PTFE material will tend to lubricate the sliding of the stem through the packing ring set 24. Thus, the PTFE disks or washers 38 serve as a lubricant in the packing ring set 24 as well as a sealing member to aid the graphite packing rings 34 in their sealing function.

With reference to FIG. 2, there is also illustrated the components of the second or upper packing ring set 28. Packing set 28 includes three V-rings including a top female adapter ring 40, a middle V-ring 42 and a lower male adapter V-ring 44. A respective carbon bushing 46 similar to carbon bushing 34 is provided at each end of the packing ring set 28.

It is preferred that the V-type packing rings 40, 42, 44 are formed of PTFE material (polytetrafluorethylene —a synthetic resin polymer) and therefore these rings are known in the trade as a "V-type PTFE packing". It is preferred that the V-rings 40 and 44 are formed of a carbon filled PTFE material and that the middle V-ring 42 is formed of a virgin or unfilled PTFE material.

A live load packing system is provided so that the two-part packing assembly consisting of the lower packing ring set 24 and the upper packing ring set 28 are maintained at a stress level that is high enough to readily cause the PTFE material in the washers 38 and in the rings 40, 42, 44 to deform and fill voids in the valve stem 16 thereby providing low friction and low emission characteristics. Because the upper packing ring set 28 is located closer to the live load system, the entire loading or stress is applied to this packing ring set to create a low emission seal. Because the upper packing ring set 28 has substantially lower friction and is located closer to the live load system than the lower packing ring set 24, it can transfer substantially most of the loading or stress to the lower packing ring set 24 which is desirable as this set is required to provide a reliable seal of the valve stem during a fire test. Also, while the stress is sufficient to cause deformation of PTFE material from the washers 38, the friction on packing ring set 24 is significantly less than if the packing set 24 contained only flexible graphite material and did not contain any of the PTFE washers 38. Thus, desirable low friction characteristics are attained while still being able to use the normally higher friction characteristics of graphite material and thus enabling the desirable fire safety characteristics of the graphite material to be utilized in the packing system.

The live load packing includes a packing follower 48 having a follower base 50 at one end, a follower guide sleeve 52 at the other end, and a follower flange 54 there between. Follower 48 includes a liner 56 formed of carbon filled PTFE or other suitable material which may be bonded to the inside surface of the packing follower as disclosed in U.S. Pat. No. 5,129,625, assigned to the same assignee as herein. A series of disk springs 58 is slidably mounted on the follower guide sleeve 52 with one end of the disk springs in contact with the flange 54 and the other end of the disk springs in contact with a packing flange 60. The packing flange 60 has suitable apertures 62 through which the packing studs 20 may be passed and includes a central aperture to allow passage of the valve stem 16.

A pair of lantern rings 64 are placed around the valve stem and between the upper packing ring set 28 and the lower packing ring set 24 to take up the remaining space within the packing bore. As in the conventional use of lantern rings and valves, the lantern rings 64 are further adapted in packing bore 22 to enable communication from the valve exterior via an access hole 66 and a connecting channel 68. This permits lubricating fluid to be inserted into the packing bore and adjacent the valve stem 16. A threaded cap 70 is threadably mounted into the hole 66 and can be removed for access thereto. The lantern rings 64 also provide sufficient separation of the packing set 24 from the packing set 28 to prevent graphite material that has adhered to the stem from degrading the sealing performance of packing set 28.

After assembly of the valve components as shown in the drawings, the packing nuts 18 on studs 20 surrounding the valve stem 16 are tightened so that packing flange 60 transmits the packing stud and nut load to the disk springs 58. The springs 58 in turn become compressed with continued tightening of nuts 18 so as to maintain a spring load on the packing ring sets 24, 28 through the packing follower 48.

The use of the combination of the low friction characteristics of the upper packing ring set 28 under a maintained high loading stress provides a reliable seal with desired PTFE material. Also, the use of flexible graphite rings 32 in the lower packing ring set 24 at a valve location away from the load source enables the beneficial use of graphite material for fire safety conditions to be obtained. Furthermore, the PTFE washers 38 react to the sufficient live load stress and are thin enough to enable deformation of PTFE material to aid in lubricating the valve stem during movement through the packing ring set 24 and reduce adhesion of the graphite material to the operating member. Accordingly, the two-part packing assembly of the present invention incorporates packing ring set 24 for fire safety protection at elevated temperatures in the packing area of over 1000° F. (538° C.) while the upper packing ring set 28 can be loaded significantly to provide reliable low fugitive emission sealing and low friction operation of the operating member at operating temperatures of up to 450° F. (232° C.).

As an alternative embodiment, other graphite based materials, such as composite rings or braided graphite rings could be used in place of the flexible graphite rings 32 to give different levels of friction and sealing capability. Also, other non-graphite materials, such as other elastomeric materials with low friction characteristics, fluoroelastomers or perfluoroelastomers, or other fluorine containing polymers may be used to provide a low friction, low fugitive emission seal such as provided by the PTFE material in the present illustration.

The foregoing detailed description has been given for clearness of understanding only, and no unnecessary limitations should be understood therefrom, as modifications will be obvious to those skilled in the art.

We claim:

1. A two-part, low friction live load packing system for fire safety and low fugitive emission sealing of an operating member extending in a housing containing fluid from one operating member end adjacent said fluid to a second operating member end away from said fluid comprising:

a two-part packing assembly mounted on said operating member including a respective first and second packing rings set providing a fluid seal surrounding the operating member at said first and second packing rings set for preventing fluid from leaking from said housing around said operating member;

at least one spacer ring between said first and second packing ring sets;

spring means for applying a spring loading on said two-part packing assembly to maintain said fluid seal;

said first packing ring set mounted on said operating member end adjacent said fluid including, from an inner portion of said first packing ring set outwardly toward each opposite end of said first packing ring set along said operating member, a. at least one graphite ring;

b. at least two anti-extrusion bushing rings adjacent said graphite ring; and c. a washer formed of PTFE material and mounted between each of said adjacent rings a. and b. in said first packing ring set, said first packing ring set providing low friction operation of said operating member in said housing and fire safety for said fluid;

said second packing ring set mounted on said operating member second end away from said fluid including at least two PTFE rings sandwiched between a respective anti-extrusion bushing ring;

said second packing ring set providing low fugitive emission sealing of said fluid and low friction operation of said operating member in said housing; and said spring loading on said first and second packing ring sets sufficient to reliably seal said fluid and providing low fiction operation of said operating member, wherein said spring means initially applies a temporary spring loading in excess of the normal operating load and sufficient to cause permanent deformation of said PTFE washer, and thereafter applies an optimal spring loading for low fugitive emission sealing of said second packing ring set and maintains a sufficient spring loading of substantial packing stress on said two-part packing assembly to enable said PTFE washer to partially extrude PTFE material on said operating member and to lubricate said operating member in movements through said two-part packing assembly.

2. A two-part, low friction, live load packing system according to claim 1, wherein said second packing ring set transfers substantially more of said spring loading compared to said first packing ring set.

3. A two-part, low friction live load packing system according to claim 2, wherein said spring means is provided by disk springs.

4. A two-part, low friction, live load packing system according to claim 1, wherein said second packing ring set includes V-type PTFE packing rings and said spring means maintains a sufficient spring loading of substantial packing stress to deform said PTFE material and fill voids on said operating member so as to lubricate said operating member in movements through said two-part packing assembly.

5. A two-part, low friction live load packing system according to claim 4, wherein said second packing ring set includes a PTFE female ring at one end, a PTFE male ring at the other end, and a V-ring therebetween.

6. A two-part, low friction live load packing system according to claim 5, wherein said PTFE male and female rings are formed of carbon filled PTFE and said V-ring therebetween is formed of unfilled PTFE.

7. A two-part, low friction, live load packing system for fire safety and low fugitive emission sealing of an operating member according to claim 1, wherein said at least one graphite ring is one of a flexible graphite ring, a composite graphite ring, and a braided graphite ring.

8. In a fluid valve an improved two-part, low friction live load packing system for fire safety and low fugitive emission sealing of an operating member operatively moving through the packing system in said fluid valve, said packing system reliably providing said fire safety and said low fugitive emission sealing over extended valve operating conditions, the improvement comprising:

a packing box within said valve;

packing follower mounting means for supporting said operating member in said packing box;

a two-part packing assembly including a respective first and second packing rings set spacially mounted on said operating member and providing a fluid seal surrounding the operating member at said first and second packing rings set for preventing fluid from leaking from said valve around said operating member;

spring means for applying spring loading on said two-part packing assembly to maintain said fluid seal;

said first packing ring set mounted on said operating member end adjacent said fluid including, from an inner portion of said first packing ring set outwardly toward each opposite end of said first packing ring set along said operating member, a. at least one graphite ring;

b. at least two anti-extrusion bushing rings adjacent said graphite ring; and c. a washer formed of PTFE material and mounted between each of said adjacent rings a. and b. in said first packing ring set, said first packing ring set providing low friction operation of said operating member and fire safety of said fluid; and said second packing ring set mounted on said operating member second end away from said fluid including at least two rings formed of polymeric material with low friction characteristics sandwiched between a respective anti-extrusion bushing ring; said second packing ring set providing low fugitive emission sealing of said fluid and low friction operation of said operating member;

said spring means initially applies a temporary spring loading in excess of the normal operating load and sufficient to cause permanent deformation of said PTFE washer, and thereafter applies an optimal spring loading for low fugitive emission sealing of said second packing ring set and maintaining a sufficient spring loading of substantial packing stress on said two-part packing assembly to enable said PTFE washer and said rings of polymeric material to deform said PTFE material and said polymeric material to fill voids on said operating member so as to lubricate said operating member in movements through said two-part packing assembly and thereby provide said low friction operation of said operating member.

9. The improvement in a fluid valve according to claim 8, wherein said second packing ring set transfers substantially more of said spring loading compared to said first packing ring set.

10. The improvement in a fluid valve according to claim 9, wherein said spring means is provided by disk springs.

11. The improvement in a fluid valve according to claim 8, wherein said at least two rings formed of polymeric material in said second packing ring set are V-type PTFE packing rings.

12. The improvement in a fluid valve according to claim 11, wherein said second packing ring set includes a PTFE female ring at one end, a PTFE male ring at the other end, and a V-ring therebetween.

13. The improvement in a fluid valve according to claim 12, wherein said PTFE male and female rings are formed of carbon filled PTFE and said V-ring therebetween is formed of unfilled PTFE.

14. The improvement in a fluid valve according to claim 8, wherein said at least one graphite ring is one of a flexible graphite ring, a composite graphite ring, and a braided graphite ring.

* * * * *